(12) United States Patent
Bhimanadhuni et al.

(10) Patent No.: US 10,831,467 B2
(45) Date of Patent: Nov. 10, 2020

(54) TECHNIQUES OF UPDATING HOST DEVICE FIRMWARE VIA SERVICE PROCESSOR

(71) Applicant: American Megatrends International, LLC, Norcross, GA (US)

(72) Inventors: Ramakoti Reddy Bhimanadhuni, Suwanee, GA (US); Purandhar Nallagatla, Johns Creek, GA (US); Harikrishna Doppalapudi, Norcross, GA (US); Valantina Arumugam, Cuddalore (IN); Abhitesh Kumar, Maner (IN); Muthuchamy Kumar, Chennai (IN); Satheesh Thomas, Dunwoody, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/170,907

(22) Filed: Oct. 25, 2018

(65) Prior Publication Data
US 2020/0133652 A1 Apr. 30, 2020

(51) Int. Cl.
| G06F 9/44 | (2018.01) |
| G06F 8/65 | (2018.01) |
| G06F 9/54 | (2006.01) |
| G06F 9/4401 | (2018.01) |
| G06F 8/61 | (2018.01) |

(52) U.S. Cl.
CPC .............. *G06F 8/65* (2013.01); *G06F 8/63* (2013.01); *G06F 9/4403* (2013.01); *G06F 9/54* (2013.01)

(58) Field of Classification Search
CPC ..... G06F 8/65; G06F 8/63; G06F 9/54; G06F 9/4403
See application file for complete search history.

(56) References Cited

U.S. PATENT DOCUMENTS

| 9,513,927 | B1* | 12/2016 | Sivertsen | G06F 9/4401 |
| 10,049,029 | B1* | 8/2018 | Vu | G06F 11/3664 |
| 10,572,242 | B1* | 2/2020 | Santharam | G06F 8/65 |
| 2004/0103347 | A1* | 5/2004 | Sneed | G06F 11/1433 |
| | | | | 714/32 |
| 2008/0120486 | A1* | 5/2008 | Ritz | G06F 11/203 |
| | | | | 711/173 |
| 2008/0295087 | A1* | 11/2008 | Kang | G06F 8/65 |
| | | | | 717/168 |
| 2012/0017074 | A1* | 1/2012 | Kelly | G06F 9/4411 |
| | | | | 713/100 |

(Continued)

*Primary Examiner* — Adam Lee
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes an initialization component of a host. The initialization component requests from a service processor of the host a first replacement firmware image of a first device of the host. The initialization component then receives the first replacement firmware image from the service processor. The initialization component further provides the first replacement firmware image to a first updating program. The initialization component uses the first updating program to replace the first existing firmware image on the first device with the first replacement firmware image.

18 Claims, 6 Drawing Sheets

(56) References Cited

U.S. PATENT DOCUMENTS

| | | | |
|---|---|---|---|
| 2012/0084508 A1* | 4/2012 | Suzuki | G06F 11/2089 |
| | | | 711/114 |
| 2012/0173953 A1* | 7/2012 | Flynn | G06F 11/1004 |
| | | | 714/758 |
| 2012/0180076 A1* | 7/2012 | Shutt | G06F 9/4411 |
| | | | 719/327 |
| 2013/0007430 A1* | 1/2013 | Fan | G06F 9/445 |
| | | | 713/1 |
| 2014/0282815 A1* | 9/2014 | Cockrell | H04L 63/20 |
| | | | 726/1 |
| 2015/0169330 A1* | 6/2015 | Maity | H04L 41/0813 |
| | | | 713/1 |
| 2015/0271297 A1* | 9/2015 | Zimmer | H04L 1/0041 |
| | | | 709/203 |
| 2016/0202964 A1* | 7/2016 | Butcher | G06F 8/65 |
| | | | 717/172 |
| 2016/0231804 A1* | 8/2016 | Bulusu | G06F 9/4401 |
| 2016/0246754 A1* | 8/2016 | Rao | G06F 13/4286 |
| 2016/0283221 A1* | 9/2016 | Kochar | G06F 9/45558 |
| 2017/0012770 A1* | 1/2017 | Lin | H04L 9/0891 |
| 2017/0109235 A1* | 4/2017 | Hung | G06F 11/1417 |
| 2017/0242686 A1* | 8/2017 | Vidyadhara | G06F 8/656 |
| 2017/0249136 A1* | 8/2017 | Anand | G06F 8/65 |
| 2017/0286086 A1* | 10/2017 | Narasimhan | G06F 11/1433 |
| 2017/0357500 A1* | 12/2017 | Vidyadhara | G06F 13/24 |
| 2018/0004505 A1* | 1/2018 | Annapureddy | G06F 3/0619 |
| 2018/0059974 A1* | 3/2018 | Tsirkin | G06F 21/53 |
| 2018/0300273 A1* | 10/2018 | Lambert | G06F 13/4282 |
| 2019/0042754 A1* | 2/2019 | Jreij | H04L 9/083 |
| 2019/0045358 A1* | 2/2019 | Ahmed | H04W 12/06 |
| 2019/0053290 A1* | 2/2019 | Raju | H04W 40/244 |
| 2019/0391814 A1* | 12/2019 | Warkentin | G06F 9/45558 |
| 2020/0042303 A1* | 2/2020 | Samuel | G06F 8/71 |

\* cited by examiner

US 10,831,467 B2

TECHNIQUES OF UPDATING HOST DEVICE FIRMWARE VIA SERVICE PROCESSOR

BACKGROUND

Field

The present disclosure relates generally to computer systems, and more particularly, to a service processor and an initialization component of a host that may operate together to update firmware of devices of the host.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes an initialization component of a host. The initialization component requests from a service processor of the host a first replacement firmware image of a first device of the host. The initialization component then receives the first replacement firmware image from the service processor. The initialization component further provides the first replacement firmware image to a first updating program. The initialization component uses the first updating program to replace the first existing firmware image on the first device with the first replacement firmware image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
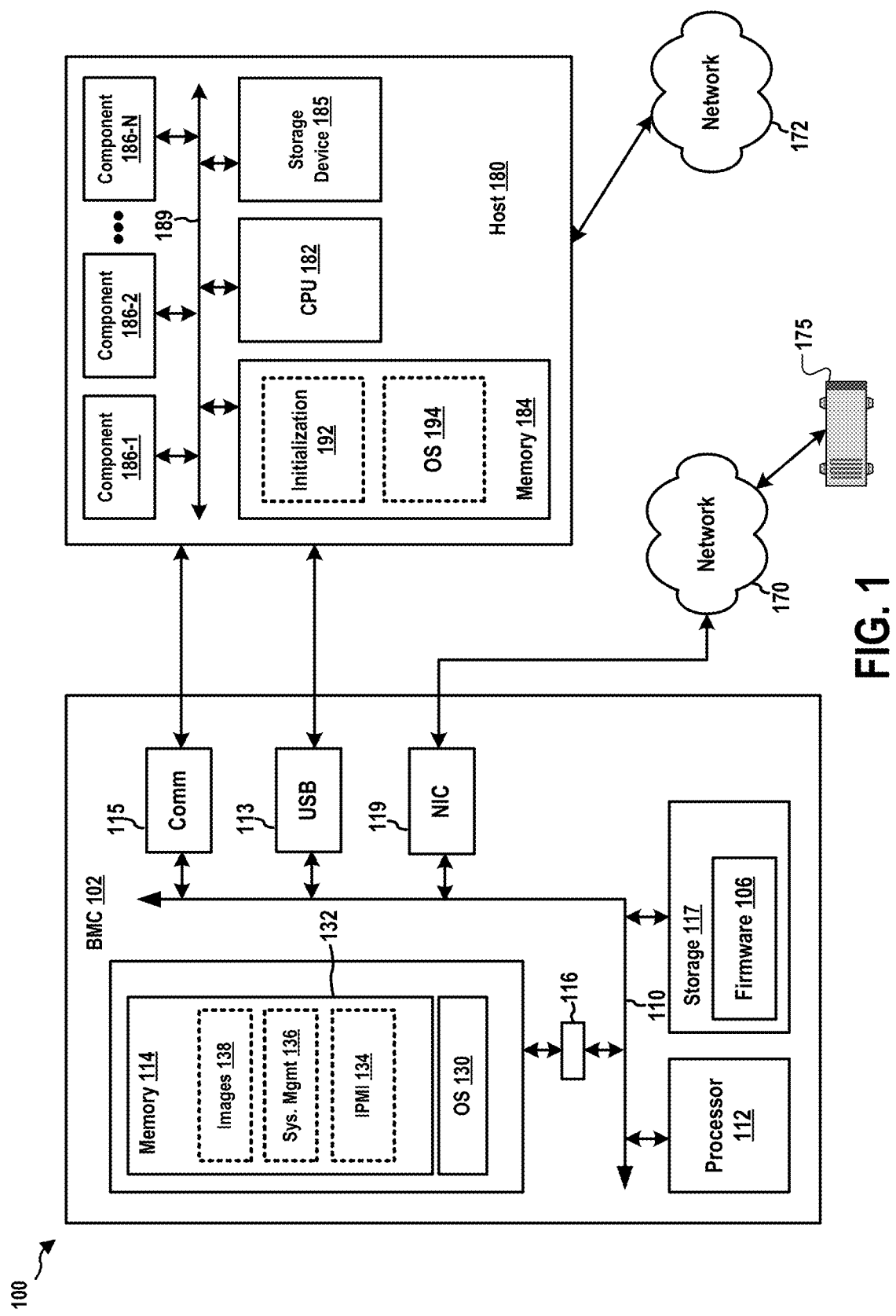
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a USB interface 113 (Universal Serial Bus), and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134 and a system management component 136. Further, the service components 132 may be implemented as a service stack. As such, the BMC firmware 106 can provide an embedded system to the BMC 102. In addition, as described infra, the system management component 136 may receive one or more replacement firmware images 138 of the component devices 186-1 to 186-N and stores the replacement firmware images 138 in the memory 114 or storage 117.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 602 shown in FIG. 6.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
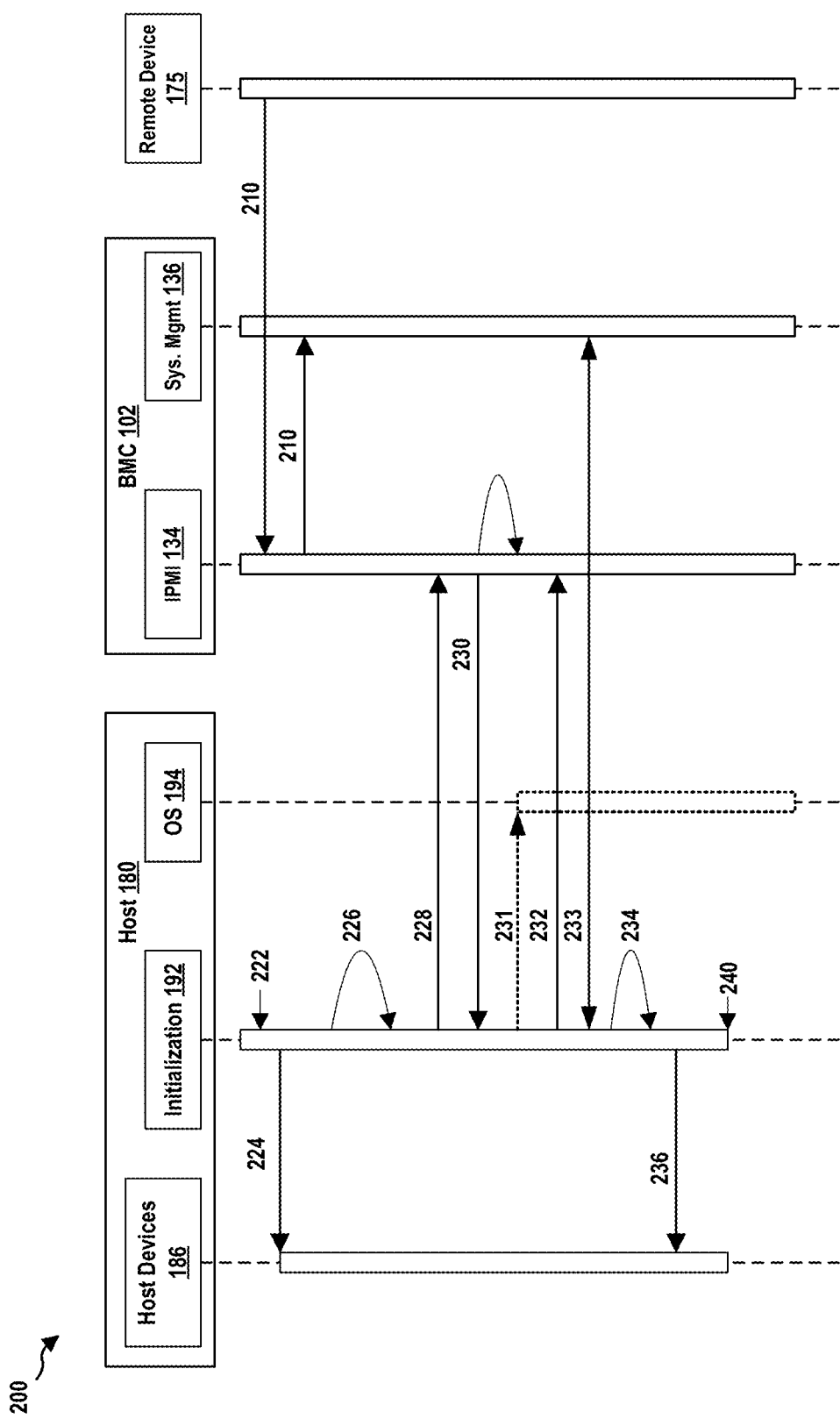
FIG. 2 is a diagram a sequence of procedures performed by the computer system.

FIG. 2 is a diagram 200 illustrating a sequence of procedures performed by the computer system 100. In procedure 210, the remote device 175 sends replacement firmware images 138 to the system management component 136 of the BMC 102 through IPMI services 134. In particular, the replacement firmware images 138 can be sent through an out-of-band connection as described supra. The system management component 136 stores the replacement firmware images 138 in the memory 114. In certain configurations, in addition to the replacement firmware images 138, the remote device 175 may also send preboot applications that can be executed in a preboot environment on the host to replace existing firmware images on corresponding host devices with the replacement firmware images 138 as described infra.

In procedure 222, the host computer 180 is powered on or reset. Accordingly, the initialization component 192 starts an initialization process. In procedure 224, the initialization component 192 can perform initiating, testing, and other routines on the hardware components of the host computer 180, which includes the host CPU 182, the host memory 184, the storage device 185, and the component devices 186-1 to 186-N.

In one example, the initialization component 192 implements UEFI. Accordingly, in procedure 226, the initialization component 192 executes UEFI boot services. Further, the initialization component 192 implements one or more management protocols (e.g., IPMI). As such, in procedure 228, the initialization component 192 can establish a communication channel with the BMC 102 in accordance with a management protocol. The initialization component 192 subsequently can use a message defined by the management protocol to send a request to the BMC 102. The request indicates that the initialization component 192 needs information regarding the replacement firmware images 138 available at the BMC 102. In this example, the management protocol is in accordance with IPMI specification. Therefore, the initialization component 192 sends an IPMI request to the IPMI services 134.

In procedure 230, the IPMI services 134 return an IPMI response to the initialization component 192. When the system management component 136 does not have the replacement firmware images 138 available for the host computer 180, the IPMI response indicates that no images are available for the host computer 180. Accordingly, in procedure 231, the initialization component 192 may proceed with loading and launching the OS 194. On the other hand, when the system management component 136 has the replacement firmware images 138 available for the host computer 180, the IPMI response identifies each of the replacement firmware images 138. For example, the IPMI response can include a list of indicators indicating one or more devices of the component devices 186-1 to 186-N whose replacement firmware images are available at the BMC 102. As such, the initialization component 192 has information regarding the replacement firmware images 138 available at the BMC 102 for the host computer 180. Then initialization component 192 then enters procedure 232.

In procedure 232, the initialization component 192 can send one or more IPMI requests to the IPMI services 134. The requests ask the BMC 102 to send one or more of the replacement firmware images 138 to the initialization component 192. In procedure 233, the initialization component 192 establishes a communication channel with the system management component 136. For example, the communication channel can be established through USB interfaces of the host computer 180 and the BMC 102. The system management component 136 subsequently sends one or more of the replacement firmware images 138 to the initialization component 192. In certain configurations, as described supra, the system management component 136 also stores the preboot applications. Accordingly, the system management component 136 also send the preboot applications to the initialization component 192 through the communication channel.

In procedure 234, for each particular image of the replacement firmware images 138, the initialization component 192 determines a corresponding device from the component devices 186-1 to 186-N. That is, the particular image contains firmware of the corresponding device and would replace the existing firmware image on the corresponding device.

In procedure 236, in certain configurations, with respect to a particular image of the replacement firmware images 138, the initialization component 192 determines a corresponding device of the particular image. The initialization component 192 select a UEFI driver from the available UEFI drivers at the host computer 180 for the corresponding device and then loads the UEFI driver. Through functionality provided by the UEFI driver, the initialization component 192 can access the storage space (e.g., a Serial Peripheral Interface (SPI) device) of the corresponding device and replace the existing firmware image in the storage space with the particular image of the replacement firmware images 138. In particular, the initialization component 192 calls an updating function of the UEFI driver based on an application programming interface (API). The updating function reads the particular image to replace the first existing firmware image on the corresponding device.

In certain configurations, as described supra, the initialization component 192 received preboot applications for updating the replacement firmware images 138 from the BMC 102. According, for a particular image, the initialization component 192 executes the associated preboot application and makes the particular image available to the preboot application. The preboot application can access the storage space of the corresponding device and replace the existing firmware image in the storage space with the particular image of the replacement firmware images 138. In procedure 240, the initialization component 192 can reboot/restart the host computer 180.

Figure 3:
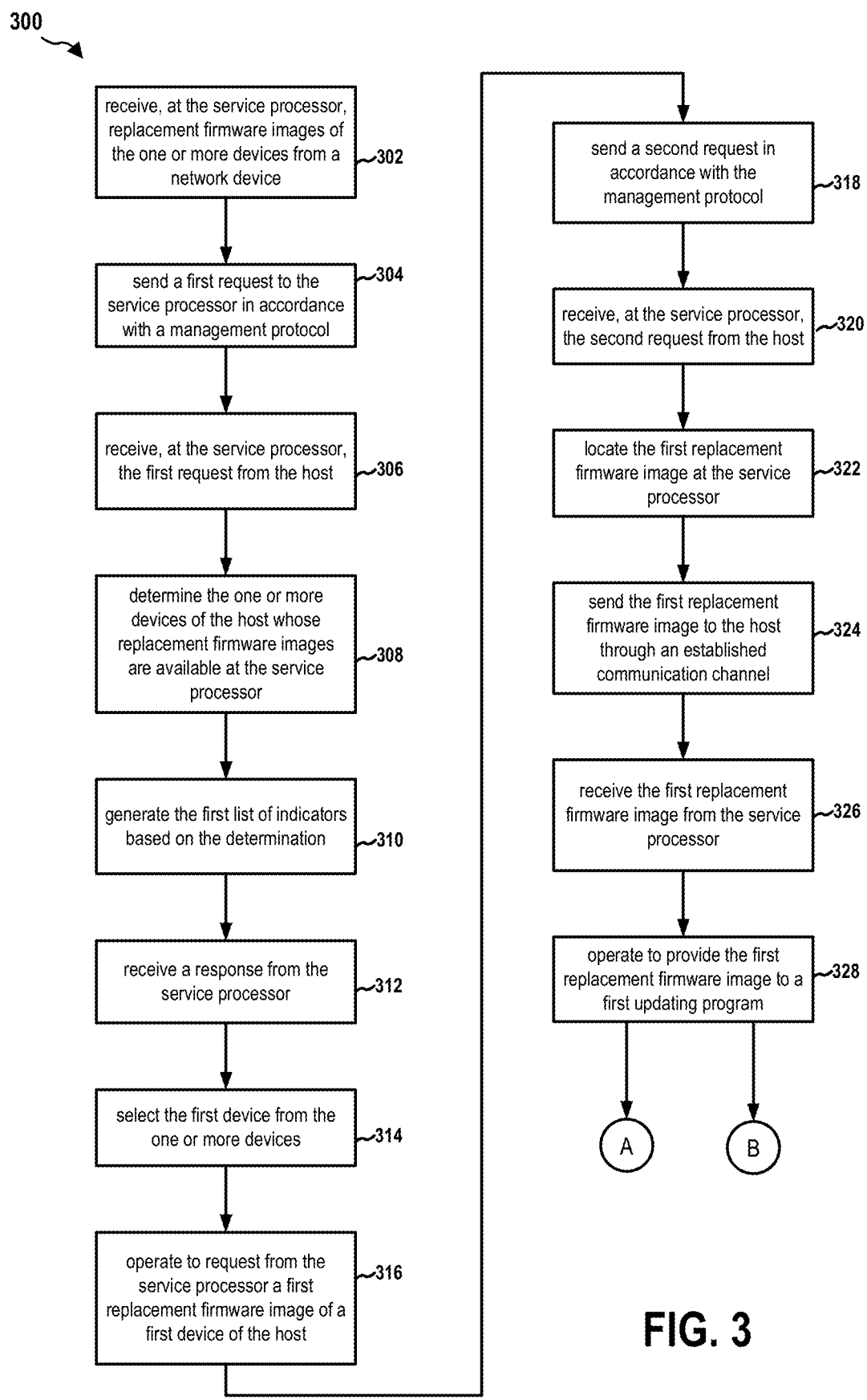
FIG. 3 is a flow chart of a method (process) for determining presence or absence as well as enablement or disablement of hardware components of a host.

FIG. 3 is a flow chart 300 of a method (process) for updating firmware of host devices. The method may be performed by a computer system (e.g., the computer system 100) including a host (e.g., the host computer 180) and a service processor (e.g., the BMC 102). The host includes an initialization component (e.g., the initialization component 192).

At operation 302, the service processor receives replacement firmware images (e.g., the replacement firmware images 138) of one or more devices (e.g., one or more of the component devices 186-1 to 186-N) of the host from a network device (e.g., the remote device 175). At operation 304, the host sends a first request to the service processor in accordance with a management protocol (e.g., IPMI). The request is for retrieving a first list of indicators indicating the one or more devices of the host whose replacement firmware images are available at the service processor. The one or more devices including a first device (e.g., one of the component devices 186-1 to 186-N).

At operation 306, the service processor receives the first request from the host. At operation 308, the service processor determines the one or more devices of the host whose replacement firmware images are available at the service processor. At operation 310, the service processor generates the first list of indicators based on the determination.

At operation 312, the host receives a response from the service processor. The response includes the first list of indicators. At operation 314, the host selects the first device from the one or more devices.

At operation 316, the host operates to request from the service processor a first replacement firmware image of the first device. In particular, the host, at operation 318, sends a second request in accordance with the management protocol. At operation 320, the service processor receives the second request from the host. At operation 322, the service processor locates the first replacement firmware image at the service processor. At operation 324, the service processor sends the first replacement firmware image to the host through an established communication channel.

At operation 326, the host receives the first replacement firmware image from the service processor. At operation 328, the host operate to provide the first replacement firmware image to a first updating program. In certain configurations, the host enters operation 410 in FIG. 4. In certain configurations, the host enters operation 510 in FIG. 5.

Figure 4:
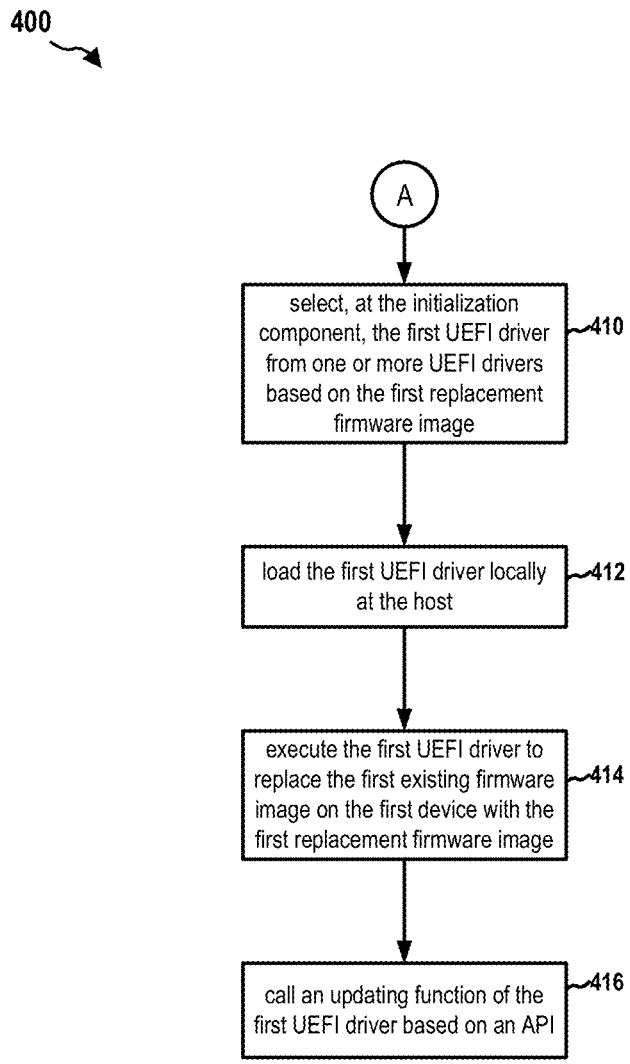
FIG. 4 is a flow chart of a method (process) for replacing existing firmware image on a host device.

FIG. 4 is a flow chart 400 of a method (process) for replacing existing firmware image on a host device. The method may be performed by a host (e.g., the host computer 180). At operation 410, in certain configurations, the first updating program described supra referring to FIG. 3 is a first UEFI driver. The host selects, at the initialization component, the first UEFI driver from one or more UEFI drivers based on the first replacement firmware image. At operation 412, the host loads the first UEFI driver locally. At operation 414, the host executes the first UEFI driver to replace the first existing firmware image on the first device with the first replacement firmware image. In particular, the host, at operation 416, calls an updating function of the first UEFI driver based on an API. The updating function reads the first replacement firmware image to replace the first existing firmware image.

Figure 5:
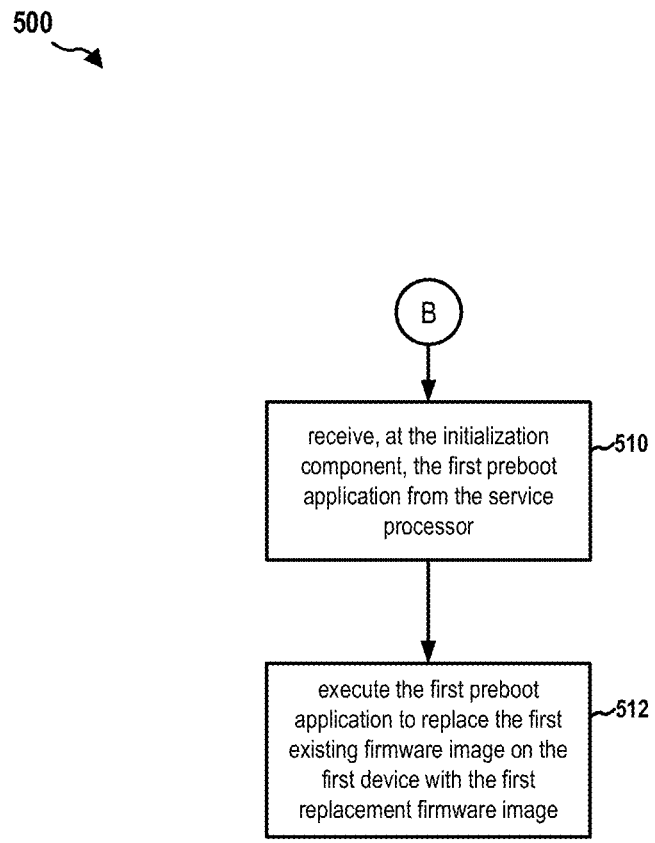
FIG. 5 is a flow chart of another method (process) for replacing existing firmware image on a host device.

FIG. 5 is a flow chart 500 of another method (process) for replacing existing firmware image on a host device. The method may be performed by a host (e.g., the host computer 180). In certain configurations, the first updating program described supra referring to FIG. 3 is a first preboot application. At operation 510, the host receives, at the initialization component, the first preboot application from the service processor. At operation 512, the host executes the first preboot application to replace the first existing firmware image on the first device with the first replacement firmware image. The first preboot application reads the first replacement firmware image to replace the first existing firmware image.

Figure 6:
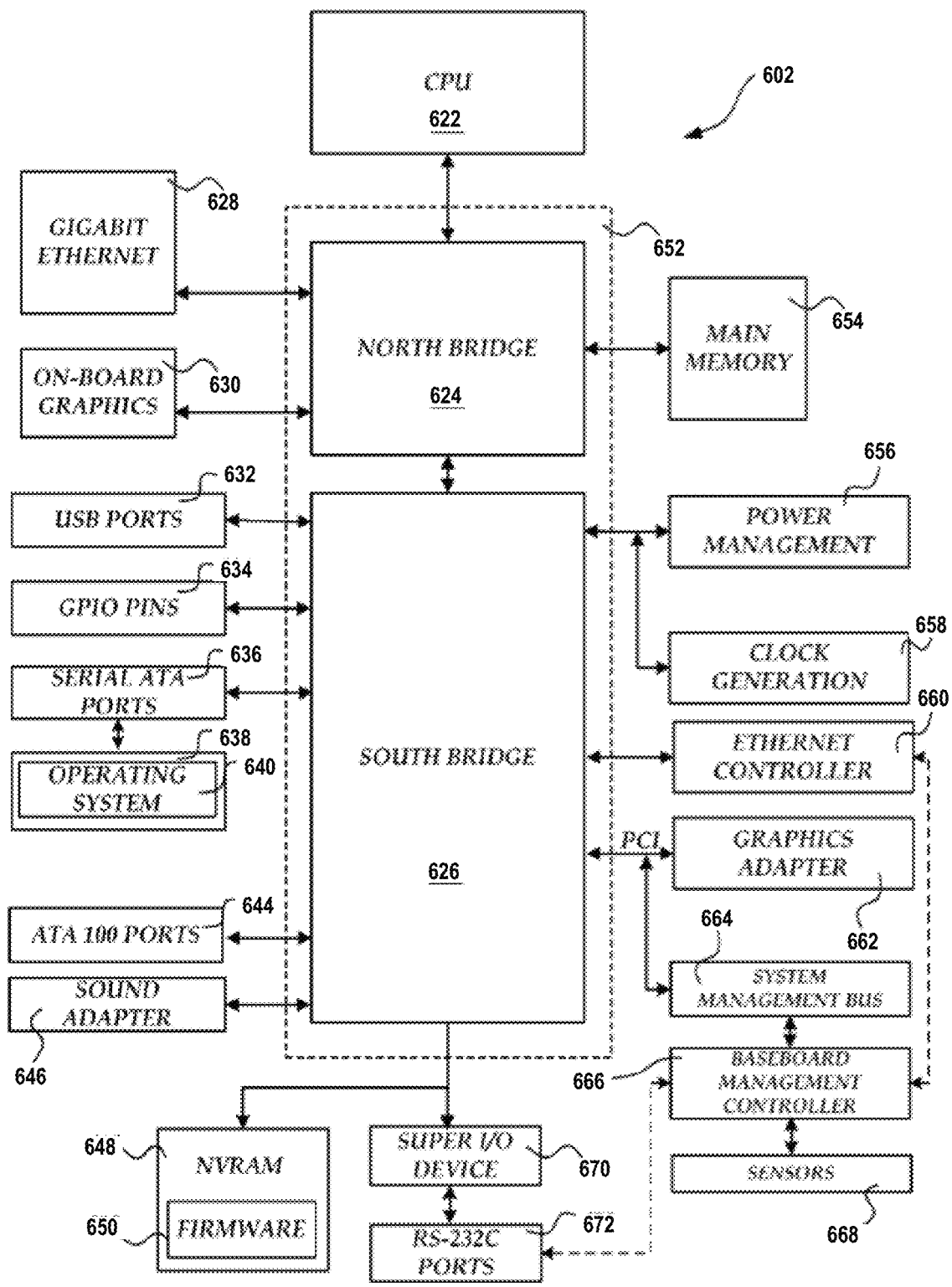
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention, the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including an initialization component of a host, comprising:
    requesting, at the initialization component, a first replacement firmware image of a first device of the host from a service processor of the host utilizing a baseboard management protocol, the initialization component being a basic input/output system (BIOS) or a Unified Extensible Firmware Interface (UEFI) boot service executed on a first processor of the host;
    receiving, at the initialization component, the first replacement firmware image from the service processor;
    providing, by the initialization component, a first updating program with the first replacement firmware image to a first updating program; and
    executing the first updating program, on the first processor of the host, to replace a first existing firmware image on a non-volatile storage of the first device with the first replacement firmware image, wherein the requesting includes:
        sending a first request to the service processor in accordance with the baseboard management protocol, the first request being for retrieving a first list of indicators indicating one or more devices of the host whose replacement firmware images are available at the service processor, the one or more devices including the first device; and
        receiving a response from the service processor, the response including the first list of indicators.

2. The method of claim 1, wherein the first updating program is a first Unified Extensible Firmware Interface (UEFI) driver, the method further comprising:
    selecting, at the initialization component, the first UEFI driver from one or more UEFI drivers based on the first replacement firmware image; and
    loading the first UEFI driver locally at the host.

3. The method of claim 2, wherein the providing the first replacement firmware image includes:
    calling an updating function of the first UEFI driver based on an application programming interface (API), wherein the updating function reads the first replacement firmware image to replace the first existing firmware image.

4. The method of claim 1, wherein the first updating program is a first preboot application, the method further comprising:
    receiving, at the initialization component, the first preboot application from the service processor; and
    executing the first preboot application to replace the first existing firmware image on the first device with the first replacement firmware image, wherein the first preboot application reads the first replacement firmware image to replace the first existing firmware image.

5. The method of claim 1, further comprising:
    prior to the requesting the first replacement firmware image, selecting the first device from the one or more devices, wherein the requesting the first replacement firmware image is through sending a second request in accordance with the management protocol.

6. The method of claim 5, wherein the computer system further includes the service processor, the method further comprising:
    receiving, at the service processor, the first request from the host;
    determining the one or more devices of the host whose replacement firmware images are available at the service processor; and
    generating the first list of indicators based on the determination.

7. The method of claim 6, further comprising:
    receiving, at the service processor, the second request from the host;
    locating the first replacement firmware image at the service processor; and
    sending the first replacement firmware image to the host through an established communication channel.

8. The method of claim 7, further comprising:
    sending, at the service processor, a preboot application associated with the first replacement firmware image to the host through the established communication channel.

9. The method of claim 6, further comprising:
    receiving, at the service processor, replacement firmware images of the one or more devices from a network device.

10. A computer system, comprising:
    a host, including a first memory; and
    first at least one processor coupled to the first memory and configured to:
        request, at the initialization component, a first replacement firmware image of a first device of the host from a service processor of the host utilizing a baseboard management protocol, the initialization component being a basic input/output system (BIOS) or a Unified Extensible Firmware Interface (UEFI) boot service executed on a first processor of the host;
        receive, at the initialization component, the first replacement firmware image from the service processor;
        provide, by the initialization component, the first replacement firmware image to a first updating program; and
        execute the first updating program, on the first processor of the host, to replace a first existing firmware image on a non-volatile storage of the first device with the first replacement firmware image, wherein to request the first replacement firmware image, the first at least one processor is further configured to:
send a first request to the service processor in accordance with the baseboard management protocol, the request being for retrieving a first list of indicators indicating one or more devices of the host whose replacement firmware images are available at the service processor, the one or more devices including the first device; and
receive a response from the service processor, the response including the first list of indicators.

11. The computer system of claim 10, wherein the first updating program is a first Unified Extensible Firmware Interface (UEFI) driver, wherein the first at least one processor is further configured to:
select, at the initialization component, the first UEFI driver from one or more UEFI drivers based on the first replacement firmware image; and
load the first UEFI driver locally at the host.

12. The computer system of claim 11, wherein to provide the first replacement firmware image, the first at least one processor is further configured to:
call an updating function of the first UEFI driver based on an application programming interface (API), wherein the updating function reads the first replacement firmware image to replace the first existing firmware image.

13. The computer system of claim 10, wherein the first updating program is a first preboot application, wherein the first at least one processor is further configured to:
receive, at the initialization component, the first preboot application from the service processor; and
execute the first preboot application to replace the first existing firmware image on the first device with the first replacement firmware image, wherein the first preboot application reads the first replacement firmware image to replace the first existing firmware image.

14. The computer system of claim 10, wherein the first at least one processor is further configured to:
prior to the requesting the first replacement firmware image, select the first device from the one or more devices, wherein the requesting the first replacement firmware image is through sending a second request in accordance with the management protocol.

15. The computer system of claim 14, wherein the computer system further includes the service processor, wherein the service processor includes
a second memory; and
second at least one processor coupled to the second memory and configured to:
receive, at the service processor, the first request from the host;
determine the one or more devices of the host whose replacement firmware images are available at the service processor; and
generate the first list of indicators based on the determination.

16. The computer system of claim 15, wherein the second at least one processor is further configured to:
receive, at the service processor, the second request from the host;
locate the first replacement firmware image at the service processor; and
send the first replacement firmware image to the host through an established communication channel.

17. The computer system of claim 16, wherein the second at least one processor is further configured to:
send, at the service processor, a preboot application associated with the first replacement firmware image to the host through the established communication channel.

18. A non-transitory computer-readable medium storing computer executable code for operating a computer system, the computer system including an initialization component of a host, comprising code to:
request, at the initialization component, a first replacement firmware image of a first device of the host from a service processor of the host utilizing a baseboard management protocol, the initialization component being a basic input/output system (BIOS) or a Unified Extensible Firmware Interface (UEFI) boot service executed on a first processor of the host;
receive, at the initialization component, the first replacement firmware image from the service processor;
provide, by the initialization component, the first replacement firmware image to a first updating program; and
execute, by the first updating program, on the first processor of the host, to replace a first existing firmware image on a non-volatile storage of the first device with the first replacement firmware image, wherein the code to request the first replacement firmware image further comprises code to:
send a first request to the service processor in accordance with the baseboard management protocol, the request being for retrieving a first list of indicators indicating one or more devices of the host whose replacement firmware images are available at the service processor, the one or more devices including the first device; and
receive a response from the service processor, the response including the first list of indicators.

* * * * *